(12) United States Patent
Hirota et al.

(10) Patent No.: US 10,811,953 B2
(45) Date of Patent: Oct. 20, 2020

(54) POWER SUPPLY DEVICE

(71) Applicant: Sumitomo Electric Industries, Ltd., Osaka-shi (JP)

(72) Inventors: Masayoshi Hirota, Osaka (JP); Keiji Tashiro, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 61 days.

(21) Appl. No.: 15/762,741

(22) PCT Filed: Sep. 21, 2016

(86) PCT No.: PCT/JP2016/077800
§ 371 (c)(1),
(2) Date: Mar. 23, 2018

(87) PCT Pub. No.: WO2017/051814
PCT Pub. Date: Mar. 30, 2017

(65) Prior Publication Data
US 2018/0219471 A1    Aug. 2, 2018

(30) Foreign Application Priority Data
Sep. 25, 2015 (JP) ................. 2015-188127

(51) Int. Cl.
*H02M 1/32* (2007.01)
*H02M 1/42* (2007.01)
(Continued)

(52) U.S. Cl.
CPC ............. *H02M 1/32* (2013.01); *B60L 53/20* (2019.02); *H02M 1/4208* (2013.01);
(Continued)

(58) Field of Classification Search
CPC .... H02M 1/42; H02M 1/4208; H02M 1/4225; H02M 1/4233; H02M 3/335;
(Continued)

(56) References Cited

U.S. PATENT DOCUMENTS 6,330,170 B1 * 12/2001 Wang ................. H02J 9/062
363/17
2009/0034300 A1 * 2/2009 Ito ....................... H02M 1/4233
363/17
(Continued)

FOREIGN PATENT DOCUMENTS

EP    2434604 A1 *  3/2012  ............... H02J 1/08
JP    2014-053992 A  3/2014
(Continued)

*Primary Examiner* — Thienvu V Tran
*Assistant Examiner* — Ivan Laboy
(74) *Attorney, Agent, or Firm* — Baker Botts L.L.P.; Michael A. Sartori

(57) ABSTRACT

A power supply device comprises: a first switching circuit that includes a series circuit, connected between a predetermined voltage level and a ground level, having a high side switching element and a low side switching element connected in series that are alternately turned on and off at a predetermined frequency; a second switching circuit that includes a switching element controlled between on and off, the switching element having one end being connected to the ground level, and that makes an ON time point of the switching element variable; and a control unit that performs control such that ON time points of the switching element and the high side switching element are not overlapped with each other.

6 Claims, 7 Drawing Sheets

(51) Int. Cl.
    *H02M 3/335*   (2006.01)
    *H02M 3/337*   (2006.01)
    *B60L 53/20*   (2019.01)
    *H02M 1/00*    (2006.01)

(52) U.S. Cl.
    CPC .......... *H02M 1/4225* (2013.01); *H02M 3/337* (2013.01); *H02M 3/33569* (2013.01); *H02M 3/33584* (2013.01); *B60L 2210/10* (2013.01); *H02M 2001/007* (2013.01); *Y02T 10/7005* (2013.01); *Y02T 10/7072* (2013.01); *Y02T 10/7216* (2013.01); *Y02T 90/127* (2013.01); *Y02T 90/14* (2013.01)

(58) Field of Classification Search
    CPC .......... H02M 3/33507; H02M 3/33523; H02M 3/33538; H02M 3/33546; H02M 3/33553; H02M 3/33569; H02M 2001/007; H02M 2007/4818; H02M 2007/4815; H02M 2007/4811; Y02B 70/1425; Y02B 70/1491
    See application file for complete search history.

(56) References Cited

U.S. PATENT DOCUMENTS

| | | | |
|---|---|---|---|
| 2012/0068663 A1* | 3/2012 | Tanikawa | B60L 53/14 320/109 |
| 2015/0280591 A1* | 10/2015 | Handa | H02M 1/4225 363/21.04 |
| 2016/0105056 A1* | 4/2016 | Namurdri | H02J 7/02 320/108 |
| 2016/0268890 A1 | 9/2016 | Ayai et al. | |
| 2018/0026520 A1 | 1/2018 | Hirota et al. | |

FOREIGN PATENT DOCUMENTS

| | | |
|---|---|---|
| JP | 2014-128060 A | 7/2014 |
| JP | 2015-139337 A | 7/2015 |
| JP | 2015-149882 A | 8/2015 |
| WO | 2015/056403 A1 | 4/2015 |
| WO | 2016/129592 A1 | 8/2016 |

\* cited by examiner

AC VOLTAGE WAVEFORM

FET11 GATE
VOLTAGE
WAVEFORM
AT PHASE A

FET11 GATE
VOLTAGE
WAVEFORM
AT PHASE B

FET31 GATE
VOLTAGE
WAVEFORM

TIME

FET32 GATE
VOLTAGE
WAVEFORM

TIME

FET41 GATE
VOLTAGE
WAVEFORM

TIME

FET42 GATE
VOLTAGE
WAVEFORM

TIME

FET11 GATE
VOLTAGE
WAVEFORM

FET31 GATE
VOLTAGE
WAVEFORM

FET32 GATE
VOLTAGE
WAVEFORM

CURRENT
FLOWING
THROUGH
FET31

FET11 GATE VOLTAGE WAVEFORM

FET31 GATE VOLTAGE WAVEFORM

FET32 GATE VOLTAGE WAVEFORM

CURRENT FLOWING THROUGH FET31

POWER SUPPLY DEVICE

CROSS-REFERENCE TO RELATED APPLICATIONS

This application is the national phase under 35 U.S.C. § 371 of PCT International Application No. PCT/JP2016/077800 which has an International filing date of Sep. 21, 2016 and designated the United States of America.

FIELD

The present invention relates to a power supply device.
The present application claims the benefit of Japanese Patent Application No. 2015-188127 filed in Sep. 25, 2015, the entire contents of which are herein incorporated by reference.

BACKGROUND

A plug-in hybrid electric vehicle (PHEV) and an electric vehicle (EV) mount an on-vehicle charger (for example, AC/DC converter) that can charge an on-vehicle high-voltage battery (DC side) by an electric power system (AC side).

Such an on-vehicle charger is generally provided with a power factor correction (PFC) circuit, a DC/DC converter, and so on (see Japanese Patent Application Laid-Open Publication No. 2014-128060).

The power factor correction circuit includes switching elements and is a circuit for correcting a power factor by making the waveform of input current close to the waveform of input voltage while the DC/DC converter includes switching elements and is a circuit for stepping up or down the output voltage from the PFC circuit and converts the resultant to DC voltage used for charging a battery.

SUMMARY

A power supply device according to the present disclosure comprises: a first switching circuit that includes a first series circuit having a high side switching element and a low side switching element connected in series that are alternately turned on and off at a predetermined frequency, a second series circuit having a high side switching element and a low side switching element connected in series that are alternately turned on and off at a predetermined frequency, and both the first series circuit and the second first series circuit are connected between a predetermined voltage level and a ground level; a second switching circuit that includes a switching element that can be off state during a dead-time when the high side switching element and the low side switching element of the first series circuit and the second series circuit are all off state, the switching element being connected to the ground level at one end, and that makes an ON time point of the switching element variable; and a control unit that performs control such that ON time points of the switching element and the high side switching element are not overlapped with each other.

The above and further objects and features of the invention will more fully be apparent from the following detailed description with accompanying drawings.

DETAILED DESCRIPTION

Figure 1:
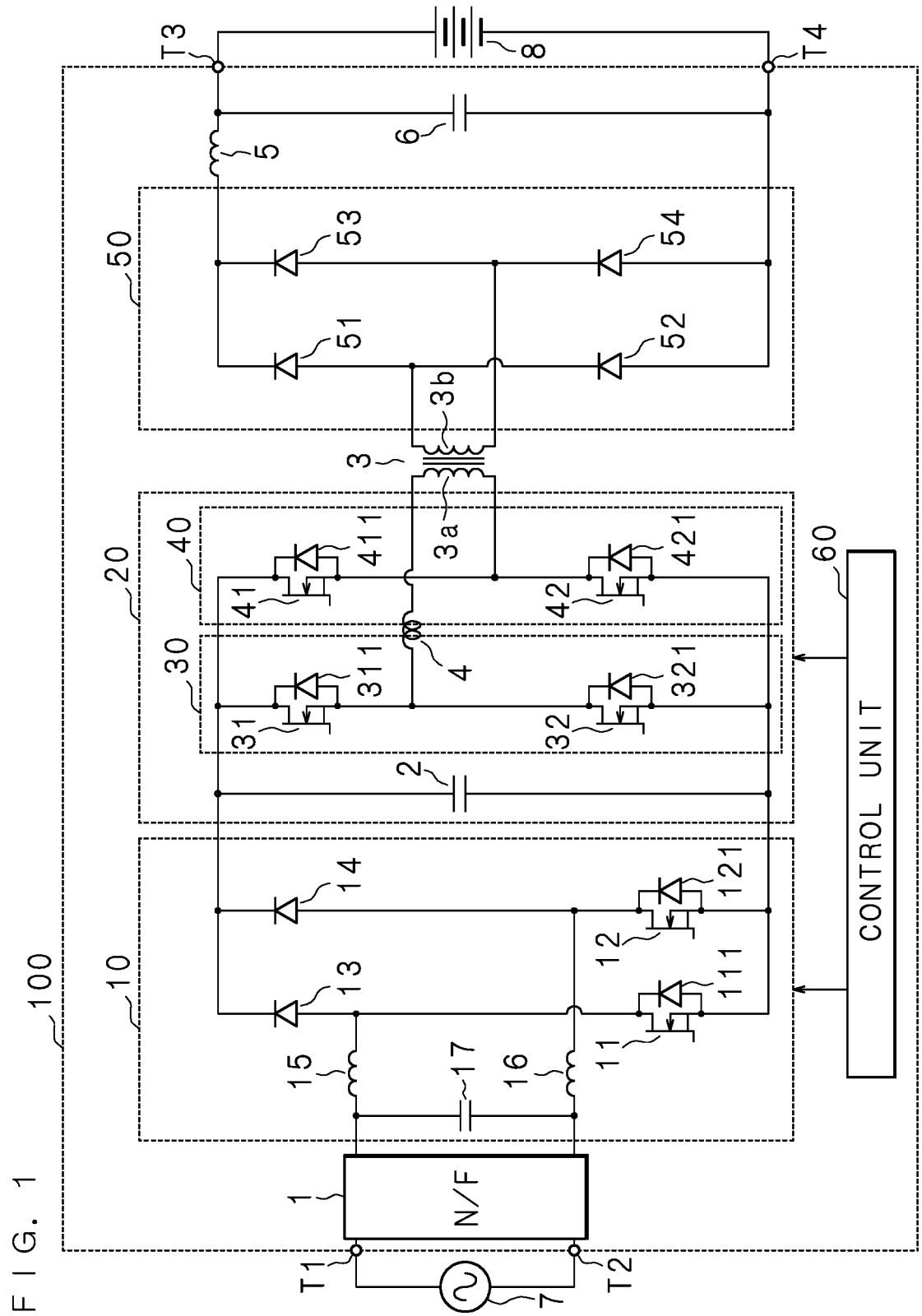
FIG. 1 is an illustrative view of one example of a circuit configuration of a power supply device according to Embodiment 1.

In recent years, there are the stringent demands for high power and miniaturization on an on-vehicle power supply device, which advances increase in current capacity and switching frequencies of the switching elements. Thus, in the case where switching circuits are closely arranged, a switching element is highly likely to malfunction (erroneously turned on or off) due to noise occurring when another switching element performs switching operation. Furthermore, the malfunction of the switching elements may cause overcurrent.

An object is to provide a power supply device capable of preventing a malfunction of a switching element from occurring.

According to the present disclosure, it is possible to prevent a malfunction of a switching element from occurring.

A power supply device according to a present embodiment comprises: a first switching circuit that includes a series circuit, connected between a predetermined voltage level and a ground level, having a high side switching element and a low side switching element connected in series that are alternately turned on and off at a predetermined frequency; a second switching circuit that includes a switching element controlled between on and off, the switching element being connected to the ground level at one end, and that makes an ON time point of the switching element variable; and a control unit that performs control such that ON time points of the switching element and the high side switching element are not overlapped with each other.

The first switching circuit includes a series circuit having a high side switching element and a low side switching element connected in series that are alternately turned on and off at a predetermined frequency, and have the series circuit connected between a predetermined voltage level and a ground level. The first switching circuit turns off the low side switching element if turning on the high side switching element while it turns on the low side switching element if turning off the high side switching element.

The second switching circuit has a switching element that is controlled between on and off and has one end connected to the ground level, and makes an ON time point of the switching element variable. That is, the one end of the switching element of the second switching circuit and the one end of the low side switching element of the first switching circuit (one end opposed to the end to which the high side switching element is connected) are connected to each other at the ground level.

The control unit performs control such that the ON time points of the switching element of the second switching circuit and the high side switching element of the first switching circuit are not overlapped with each other. In response to the switching element being turned on, current flowing through the switching element flows to the ground level. Here, by stray capacitance that exists between the ground level and the gate of the low side switching element, voltage is generated at the gate of the low side switching element, which may causes the low side switching element to malfunction, that is, to be erroneously turned on. Assuming that the ON time point of the switching element of the second switching circuit and the ON time point of the high side switching element of the first switching circuit are overlapped with each other, when the low side switching element is erroneously turned on, both of the high side switching element and the low side switching element are simultaneously turned on, which may cause overcurrent.

By performing control such that the ON time points of the switching element of the second switching circuit and the high side switching element of the first switching circuit are not overlapped with each other, overcurrent may be prevented from occurring.

In the power supply device according to the present embodiment, the first switching circuit includes a plurality of series circuits connected in parallel, and the control unit performs control such that ON time points of the switching element and the high side switching elements of the respective one of the series circuits are not overlapped with each other.

The first switching circuit includes a plurality of series circuits connected in parallel. The control unit performs control such that ON time points of the switching element and the high side switching elements of the respective one of the series circuits are not overlapped with each other. Thus, even if the first switching circuit includes a plurality of series circuits connected in parallel, both of the high side switching elements and the low side switching elements are not simultaneously turned on, which prevents overcurrent from occurring.

The power supply device according to the present embodiment further comprises a transformer, and the first switching circuit has one winding of the transformer connected at connection points of high side switching elements and low side switching elements of the respective one of the series circuits, and has a rectifier circuit connected to anther winding of the transformer.

The power supply device includes a transformer. The first switching circuit has one winding of the transformer connected at the connection points of the high side switching elements and the low side switching elements of the respective series circuits, and has a rectifier circuit connected to another winding of the transformer.

As one example of the control, current in one direction flows to one of the windings of the transformer by turning on the high side switching element of one series circuit, turning off the low side switching element of the one series circuit, turning off the high side switching element of the other series circuit, and turning on the low side switching element of the other series circuit, for example. Then, current in a direction opposed to the one direction flows to the one of the windings of the transformer by turning off the high side switching element of one series circuit, turning on the low side switching element of the one series circuit, turning on the high side switching element of the other series circuit, and turning off the low side switching element of the other series circuit. Thus, alternate current (hereafter referred to as AC) can be withdrawn from the other of the windings of the transformer, and the withdrawn current is rectified by the rectifier circuit, which may achieve a DC/DC converter that steps up or down the DC voltage. That is, in the case where the first switching circuit is a part of the configuration of the DC/DC converter, both of the high side switching element and the low side switching element are not simultaneously turned on, which prevents overcurrent from occurring.

In the power supply device according to the present embodiment, the second switching circuit comprises: an inductor, and a diode having an anode connected to one end of the inductor. The cathode of the diode is connected to one end of the high side switching element, and another end of the switching element is connected to a connection point of the inductor and the diode.

The second switching circuit comprises an inductor and a diode having the anode connected to one end of the inductor. The cathode of the diode is connected to one end of the high side switching element, and another end of the switching element is connected to the connection point of the inductor and the diode.

By making the ON time point of the switching element of the second switching circuit variable, the duty ratio, which is the ratio of the duration during which the switching element is turned on per a switching cycle can be made variable. By causing the current flowing through the inductor to bypass to the switching element when the switching element is turned on, and causing the current flowing through the inductor to flow to the diode when the switching element is turned off, it is possible to achieve the PFC circuit making the waveform of input current close to the waveform of input voltage. That is, in the case where the second switching circuit constitutes a PFC circuit, both of the high side switching element and the low side switching element are not simultaneously turned on, which prevents overcurrent from occurring.

Embodiment 1

Embodiments of the present invention will be described below with reference to the drawings. FIG. 1 is an illustrative view of one example of a circuit configuration of a power supply device 100 according to Embodiment 1. The power supply device 100 according to Embodiment 1 is, for example, a charging device that is mounted on a plug-in hybrid electric vehicle or an electric vehicle and charges an on-vehicle battery by converting AC voltage into DC voltage. As illustrated in FIG. 1, the power supply device 100 includes a noise filter (N/F) 1, a second switching circuit 10 having a PFC function, a first switching circuit 20, a transformer 3, a rectifier circuit 50, a control unit 60 for performing control, between on and off, on the switching elements of the first switching circuit 20 and the second switching circuit 10.

The second switching circuit 10 includes an FET 11 and an FET 12 as switching elements, diodes 13 and 14, inductors 15 and 16, a capacitor 17 and so on. The sources (one end) of the FET 11 and the FET 12 are connected to the ground level.

Furthermore, the second switching circuit 10 includes the diode 13 having an anode connected to one end of the inductor 15 and the diode 14 having an anode connected to one end of the inductor 16. The cathodes of the diodes 13 and 14 are respectively connected to the drains (one end) of FETs 31 and 41 described later. Furthermore, the drain (the other end) of the FET 11 is connected to the connection point of the inductor 15 and the diode 13 whereas the drain (the other end) of the FET 12 is connected to the connection point of the inductor 16 and the diode 14.

The other ends of the inductors 15 and 16 are respectively connected to AC terminals T1 and T2 via the noise filter 1. The capacitor 17 is connected across the other ends of the inductors 15 and 16. An AC power supply 7 is connected across the AC terminals T1 and T2.

Between the drains and the sources of the FETs 11 and 12, diodes 111 and 121 are respectively connected in antiparallel. That is, the cathode of the diode 111 is connected to the drain of the FET 11 while the anode of the diode 111 is connected to the source of the FET 11. The same applies to the FET 12.

The control unit 60 performs control on the FETs 11 and 12 between on and off. Furthermore, the control unit 60 may make the timing when the FETs 11 and 12 are turned on (hereinafter referred to as ON time point) variable.

A capacitor 2 is connected between the second switching circuit 10 and the first switching circuit 20, that is, between a predetermined voltage level and the ground level.

The first switching circuit 20 includes multiple (two in example of FIG. 1) series circuits 30 and 40 arranged in parallel.

The series circuit 30 includes an FET 31 serving as a high side switching element and an FET 32 serving as a low side switching element connected in series that are alternately turned on and off at a predetermined frequency. More specifically, the drain of the FET 31 is connected to a predetermined voltage level (positive side), the source of the FET 31 is connected to the drain of the FET 32, and the source of the FET 32 is connected to the ground level.

As one example of control, the control unit 60 performs control such that the FET 32 is turned off if the FET 31 is turned on while the FET 32 is turned on if the FET 31 is turned off.

Similarly, the series circuit 40 includes an FET 41 serving as a high side switching element and an FET 42 serving as a low side switching element connected in series that are alternately turned on and off at a predetermined frequency. More specifically, the drain of the FET 41 is connected to a predetermined voltage level (positive side), the source of the FET 41 is connected to the drain of the FET 42, and the source of the FET 42 is connected to the ground level.

As one example of control, the control unit 60 performs control such that the FET 42 is turned off if the FET 41 is turned on while the FET 42 is turned on if the FET 41 is turned off.

Between the drains and the sources of the FETs 31, 32, 41 and 42, diodes 311, 321, 411 and 421 are respectively connected in antiparallel. That is, the cathode of the diode 311 is connected to the drain of the FET 31 while the anode of the diode 311 is connected to the source of the FET 31. The same applies to the FETs 32, 41 and 42.

The first switching circuit 20 includes one end of one winding 3a of the transformer 3 connected to the connection point of the FET 31 and the FET 32 of the series circuit 30 via a coil 4, and the other end of the winding 3a of the transformer 3 connected to the connection point of the FET 41 and FET 42. The other winding 3b of the transformer 3 is connected to the rectifier circuit 50.

The rectifier circuit 50 is formed by diodes 51, 52, 53 and 54, and full-wave rectifies AC output from the transformer 3. There are provided, at the succeeding stage of the rectifier circuit 50, an inductor 5 having one end connected to the cathodes of the diodes 51 and 53 and a capacitor 6 that has one end connected to the other end of the inductor 5 and is connected across the DC terminals T3 and T4. Across the DC terminals T3 and T4, a battery 8 is connected.

The outline of the operation of the power supply device 100 according to the present embodiment will be described below. That is, when AC voltage 7 is applied to the AC terminals T1 and T2, the second switching circuit 10 works as a power factor correction (PFC) circuit, and the control unit 60 makes the waveform of input current close to the waveform of input voltage by performing control on the timing of turning on and off of the FETs 11 and 12 (making the ON time point variable).

The DC output from the second switching circuit 10 is smoothed by the capacitor 2, and the smoothed DC is supplied to the first switching circuit 20.

The control unit 60 turns on and off the FETs 31, 32, 41 and 42 at a predetermined frequency (50 kHz-200 kHz, for example, though not limited thereto) to generate AC from the transformer 3. The AC generated by the transformer 3 is rectified by the rectifier circuit 50, further smoothed by the inductor 5 and the capacitor 6 and then output from the DC terminals T3 and T4.

Figure 2:
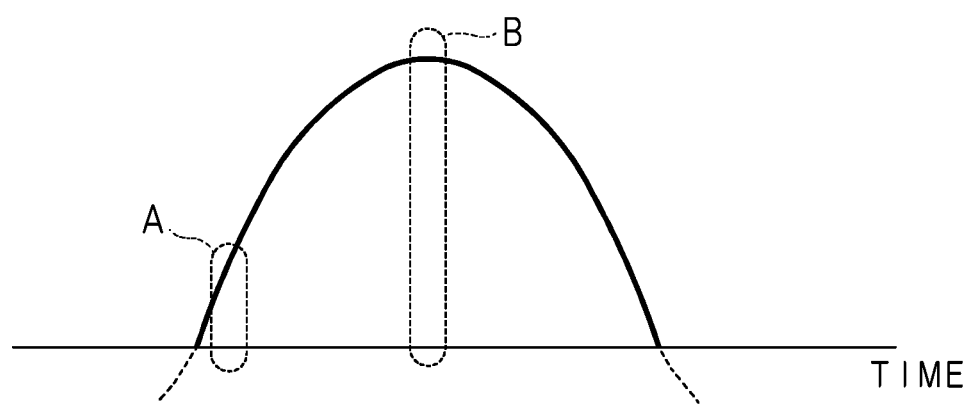
FIG. 2 is an illustrative view of one example of operation of a second switching circuit according to Embodiment 1.
Figure 2:
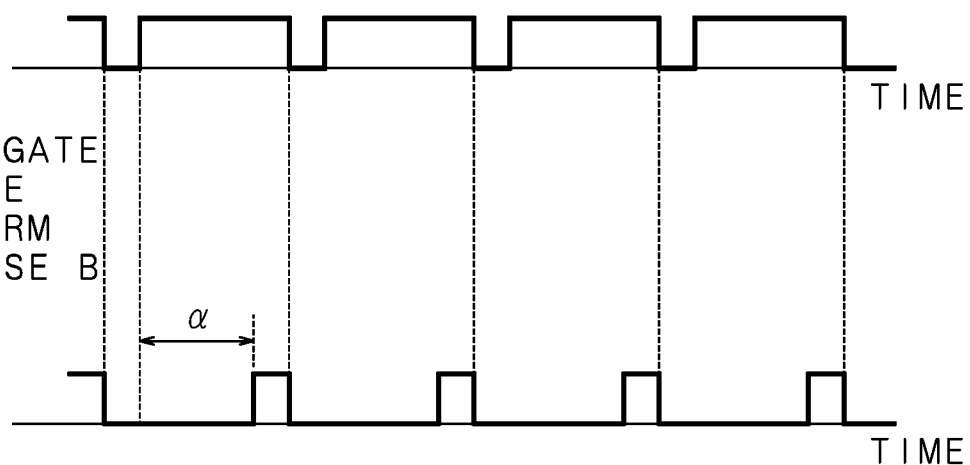

The following describes the operation of the power supply device 100 according to the present embodiment in detail. FIG. 2 is an illustrative view of one example of operation of the second switching circuit 10 according to Embodiment 1. AC voltage is applied to the input side of the second switching circuit 10, while description is made on a positive half cycle of the AC voltage in an example in FIG. 2. For the positive half-cycle, the AC terminal T1 is a positive side while the AC terminal T2 is a negative side. The chart at the top in FIG. 2 depicts a waveform of AC voltage by a positive half-cycle, the chart at the middle depicts a waveform of the gate voltage of the FET 11 around the phase A of the AC voltage, and the chart at the bottom depicts a waveform of the gate voltage of the FET 11 around the phase B of the AC voltage.

During the positive half-cycle, when the FET 11 is turned on, current supplied via the AC terminals T1 and T2 flows through the inductor 15, the FET 11 and the diode 121 to the inductor 16, and no current (zero) is output from the second switching circuit 10 via the diode 13. When the FET 11 is then turned off, by the energy stored in the inductor 15, current flows from the inductor 15, through the diode 13, the first switching circuit 20 and the diode 121, to the inductor 16. Similarly, during the negative half-cycle, the FET 12 is repeatedly turned on and off.

As illustrated in FIG. 2, since the peak value of the AC voltage is relatively small around the phase A, the peak value of the current is also required to be small. Thereupon, by extending the duration of the on state of the FET 11, the current is bypassed at the FET 11 to make the current flowing through the diode 13 small.

Meanwhile, since the peak value of the AC voltage is relatively large around the phase B, the peak value of the current is also required to be made large. Thereupon, by shortening the duration of the on state of the FET 11 (indicated by a reference code a in FIG. 2), the current bypassed in the FET 11 is reduced to make the current flowing through the diode 13 large.

That is, by making the ON time point of the EFT 11 variable, a duty ratio, which is the ratio of the duration of an on-state of the FET 11 per a switching cycle, can be made variable. By causing the current flowing through the inductors 15 and 16 to bypass to the FET 11 when the FET 11 is in an on state, and causing the current flowing through the inductors 15 and 16 to flow to the diode 13 when the FET 11 is in an off state, it is possible to achieve the PFC circuit that makes the waveform of input current close to the waveform of input voltage. The same applies to the negative half-cycle, and thus the description thereof will not be repeated here.

Figure 3:
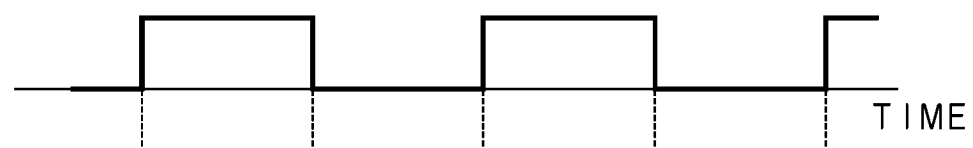
FIG. 3 is an illustrative view of one example of operation of a first switching circuit according to Embodiment 1.
Figure 3:
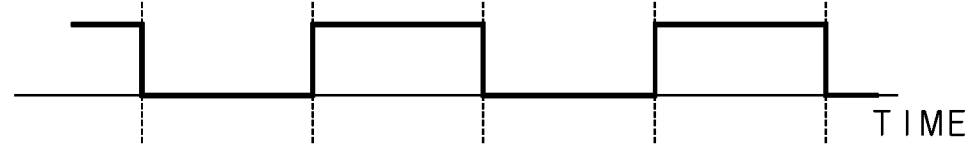
Figure 3:
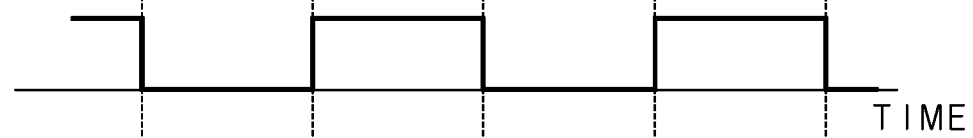
Figure 3:
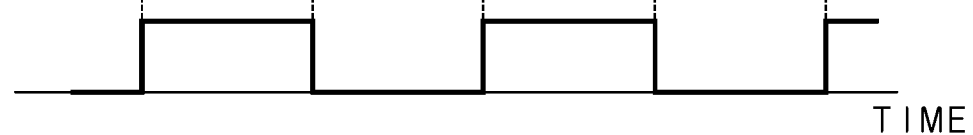

FIG. 3 is an illustrative view of one example of an operation of the first switching circuit 20 according to Embodiment 1. As illustrated in FIG. 3, the control unit 60 makes current flow in one direction into one winding 3a of the transformer 3 by turning on the FET 31 (high side switching element of one series circuit), turning off the FET 32 (low side switching element of the one series circuit), turning off the FET 41 (high side switching element of the other series circuit), and turning on the FET 42 (low side switching element of the other series circuit). Then, the control unit 60 flows makes current flow in a direction opposed to the one direction into the one winding 3a of the transformer 3 by turning off the FET 31, turning on the FET 32, turning on the FET 41, and turning off the FET 42. Similar operations are repeated at a predetermined frequency thereafter. AC can be withdrawn from the other one of the windings 3b of the transformer 3, and the withdrawn AC is rectified by the rectifier circuit 50, whereby a DC/DC converter that steps up or down the DC voltage may be achieved.

Subsequently, description is made on overcurrent that may occur in the FETs of the first switching circuit 20 in the case where the switching operation of the FETs are independently controlled as in the first switching circuit 20 and the second switching circuit 10, the sources of the low-voltage side FETs of the first switching circuit 20 and the second switching circuit 10 are connected to a common ground level, and the ON time point of the FETs (FETs 11 and 12 in the present embodiment) may be made variable.

Figure 4:
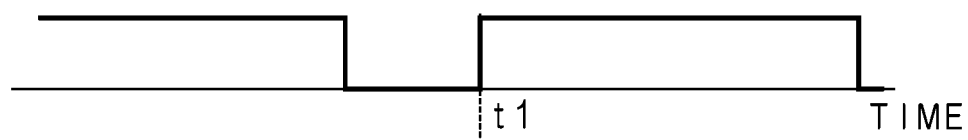
FIG. 4 is an illustrative view of one example of a case where overcurrent occurs due to operation of FETs of the first switching circuit and the second switching circuit.
Figure 4:
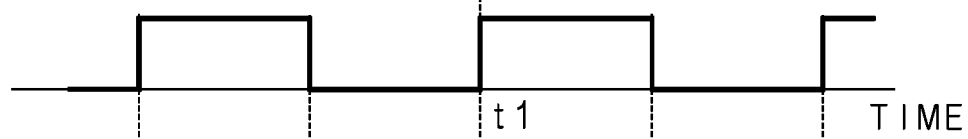
Figure 4:
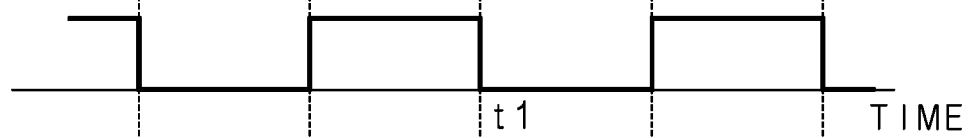
Figure 4:
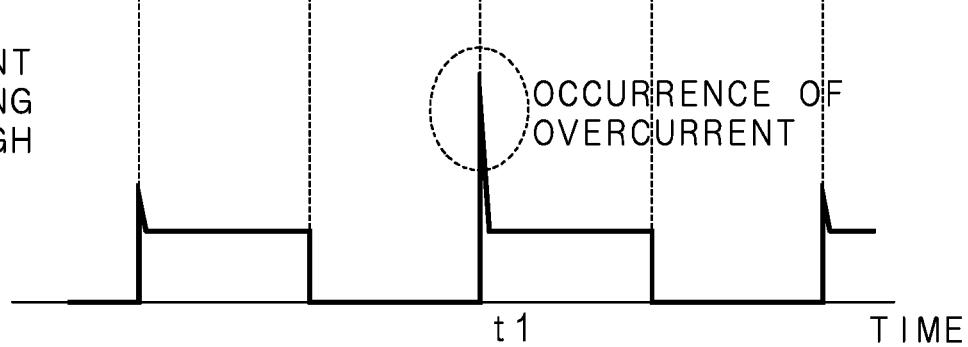

FIG. 4 is an illustrative view of one example of a case where overcurrent occurs due to the operation of the FETs of the first switching circuit and the second switching circuit. FIG. 4 illustrates, as a comparative example, overcurrent occurring due to the operations by the FETs of the first switching circuit and the second switching circuit assuming that the control by the control unit 60 according to the present embodiment is not performed in the circuit configuration illustrated in FIG. 1. As described above, since the second switching circuit 10 is a PFC circuit, in order to make the waveform of input current close to the waveform of input voltage, the control unit 60 makes the ON time points of the FET 11 and the FET 12 variable in accordance with the phase of the AC voltage for adjustment of the duty ratio of the FET 11 and the FET 12. Meanwhile, the first switching circuit 20 is a DC/DC converter, and the FETs 31 and 32 of the series circuit 30 are alternately turned on and off while the FET 41 and 42 of the series circuit 40 are alternately turned on and off.

It is assumed that the FET 11 is turned on at the time point t1 in the case where the FET 31 is turned on, and the FET 32 is turned off at the time point t1 as illustrated in FIG. 4.

Figure 5:
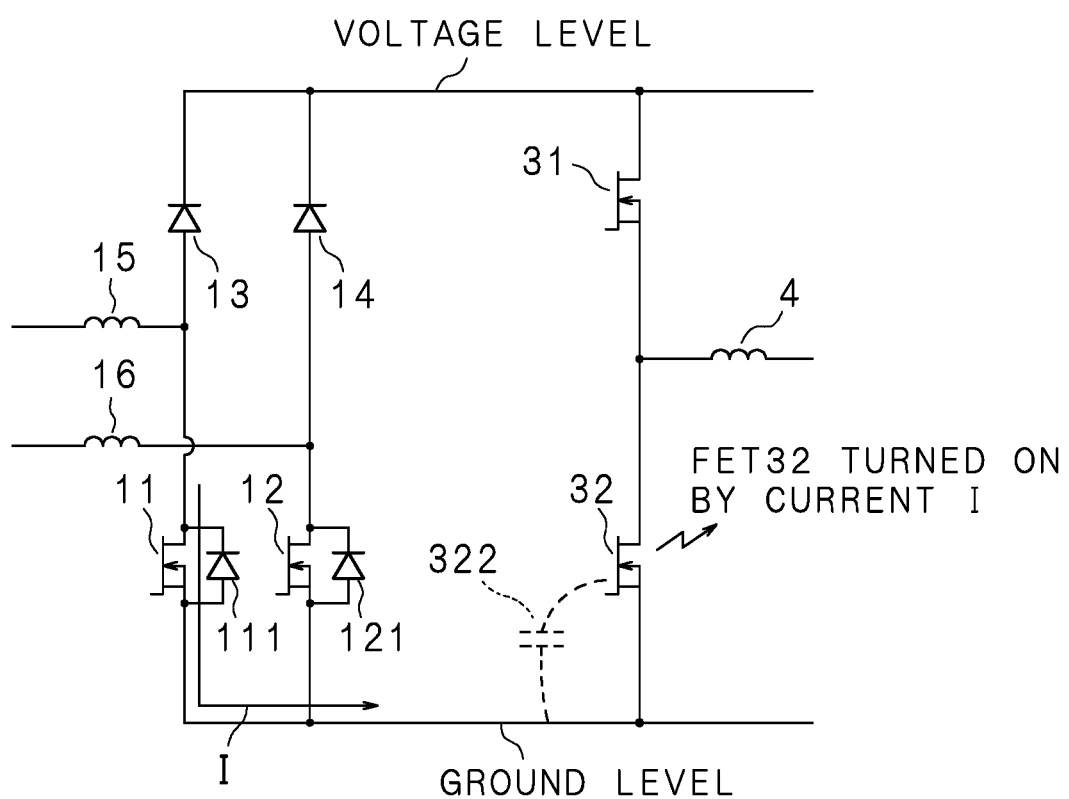
FIG. 5 is an illustrative view of one example of a malfunction of an FET of the second switching circuit.

FIG. 5 is an illustrative view of one example of a malfunction of the FET of the second switching circuit. As illustrated in FIG. 5, stray capacitance exists between the gate and the source of the low-voltage side FET 32 of the series circuit 30. Furthermore, the source of the FET 11 of the second switching circuit 10 and the source of the low-voltage side FET 32 of the first switching circuit 20 are connected to each other at the ground level as described above. Turning on of the FET 11 of the second switching circuit 10 causes current flowing through the FET 11 to flow to the ground level. Here, the potential of the ground level varies, and by stray capacitance 322 that exists between the ground level and the gate of the FET 32, voltage is generated at the gate of the FET 32, which may cause the FET 32 to malfunction, that is, to be erroneously turned on.

Then, in the case where the ON time points of the FET 11 of the second switching circuit 10 and the high side FET 31 of the first switching circuit 20 are overlapped with each other as illustrated in FIG. 4, when the low-voltage side FET 32 is erroneously turned on, both of the FETs 31 and 32 are simultaneously turned on, resulting in occurrence of overcurrent at the time point t1.

Noted that, in FIG. 4, description is made for the ON time points of the FET 11 and the FETs 31 and 32. The description may apply to the ON time points for the FET 11 and the FETs 41 and 42. Noted that description for the ON time point of the EFT 12 is similar to that for the ON time point of the EFT 11, and thus the detailed description thereof is not made here.

Figure 6:
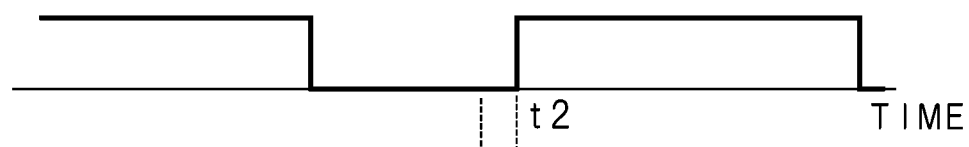
FIG. 6 is an illustrative view of one example of control on the FETs by the power supply device according to the present embodiment.
Figure 6:
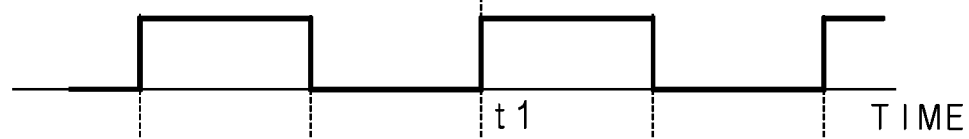
Figure 6:
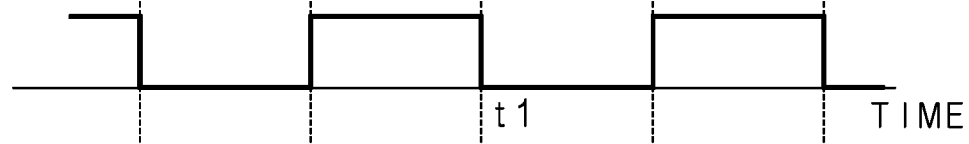
Figure 6:
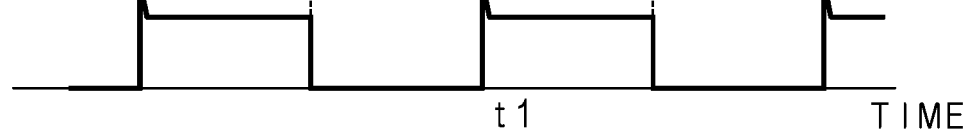

Next, description will be made on control for preventing overcurrent by the control unit 60 according to the present embodiment. FIG. 6 is an illustrative view of one example of control on the FETs by the power supply device 100 according to the present embodiment. As illustrated in FIG. 6, the control unit 60 performs control such that the ON time points of the FET 11 of the second switching circuit 10 and the ON time point of the high side FET 31 of the first switching circuit 20 are not overlapped with each other. In the example in FIG. 6, the time point t1 when the FET 31 is turned on and the time point t2 when the FET 11 is turned on are deviated by Δt.

By performing control such that the ON time point of the FET 11 of the second switching circuit 10 and the ON time point of the high side FET 31 of the first switching circuit 20 are not overlapped with each other, both of the FETs 31 and 32 will not be simultaneously turned on (may prevent malfunction of the FET occurring), which may prevent overcurrent from occurring.

In the example of FIG. 6, description is made for the ON time points of the FET 11 and the FET 31 and 32. The description may also apply to the ON time points of the FET 11 and the FETs 41 and 42. That is, the control unit 60 performs control such that the ON time points of the FET 11 and the high side FETs 31 and 41 of the respective series circuits are not overlapped with each other. Thus, even if the first switching circuit 20 includes multiple series circuits connected in parallel, both of the FETs 31 and 32 or both of the FETs 41 and 42 are not simultaneously turned on, which may prevent overcurrent from occurring. Noted that description for the ON time point of the EFT 12 is similar to that for the ON time point of the EFT 11.

Furthermore, according to the present embodiment, in the case where the first switching circuit 20 is a part of the configuration of a DC/DC converter, both of the high side FET and the low side FET are not simultaneously turned on, which prevents overcurrent from occurring.

In addition, according to the present embodiment, in the case where the second switching circuit 10 constitutes a PFC circuit, both of the high side FETs and the low side FETs are never simultaneously turned on, which may prevent overcurrent from occurring.

Embodiment 2

Figure 7:
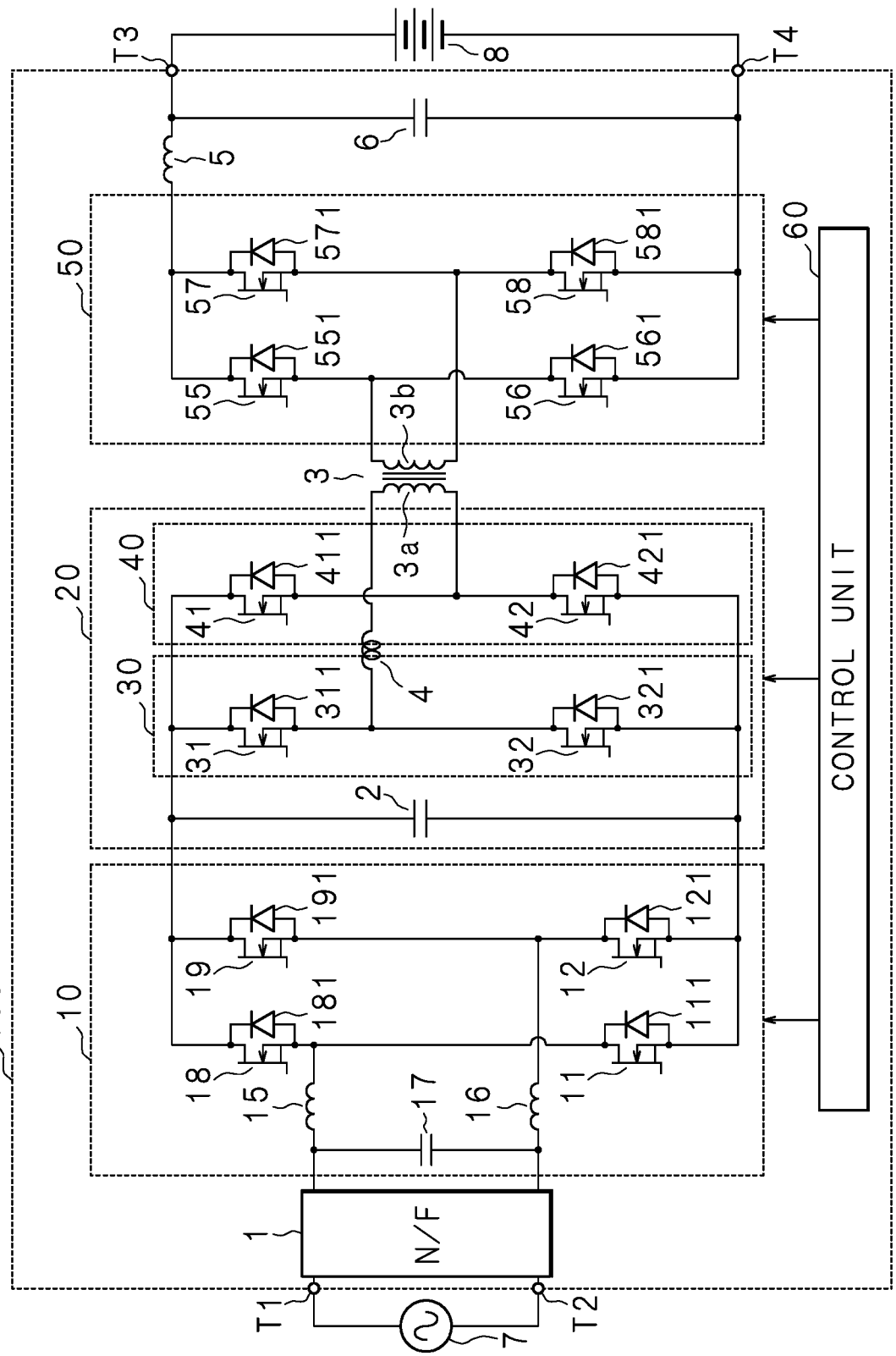
FIG. 7 is an illustrative view of one example of a circuit configuration of a power supply device according to Embodiment 2.

In the above-described Embodiment 1, the power supply device 100 is a charging device, but the power supply device is not limited to the charging device. FIG. 7 is an illustrative view of one example of a circuit configuration of a power supply device 100 according to Embodiment 2. The power supply device 100 according to Embodiment 2 is, for example, an insulation converter that is mounted on a plug-in hybrid electric vehicle or an electric vehicle and performs bidirectional conversions between AC voltage and DC voltage. The difference from Embodiment 1 is in that the second switching circuit 10 is a bidirectional conversion circuit having a PFC (power factor correction) function, and a rectifier circuit 50 is a bidirectional conversion circuit. Description will be made below regarding the second switching circuit 10 as a bidirectional conversion circuit 10 and regarding the rectifier circuit 50 as a bidirectional conversion circuit 50.

The bidirectional conversion circuit 10 is obtained by replacing the diode 13 of the second switching circuit 10 with an FET 18 and a diode 181 connected in antiparallel between the drain and the source of the FET 18, and replacing the diode 14 of the second switching circuit 10 with an FET 19 and a diode 191 connected in antiparallel between the drain and the source of the FET 19. The control unit 60 performs control on the FETs 11, 12, 18 and 19 between on and off. The bidirectional conversion circuit 10 thus operates as a PFC circuit and a rectifier circuit in the case where the battery 8 is charged while operating as a DC/AC converter in the case where the battery 8 is discharged to allow the AC terminals T1 and T2 to output AC.

The bidirectional conversion circuit 50 is obtained by replacing the diode 51 of the rectifier circuit 50 with an FET 55 and a diode 551 connected in antiparallel between the drain and the source of the FET 55, replacing the diode 52 of the rectifier circuit 50 with an FET 56 and a diode 561 connected in antiparallel between the drain and the source of the FET 56, replacing the diode 53 of the rectifier circuit 50 with an FET 57 and a diode 571 connected in antiparallel between the drain and the source of the FET 57, and replacing the diode 54 of the rectifier circuit 50 with an FET 58 and a diode 581 connected in antiparallel between the drain and the source of the FET 58. The control unit 60 performs control on the FETs 55, 56, 57 and 58 between on and off. The bidirectional conversion circuit 50 thus operates as a rectifier circuit in the case where the battery 8 is charged while operating as a DC/AC converter in the case where the battery 8 is discharged to allow the AC terminals T1 and T2 to output AC.

In Embodiment 2 as well, the control unit 60 performs operation similar to that illustrated in FIG. 6. That is, the control unit 60 performs control such that the ON time point of the EFT 11 and the ON time points of the high side FETs 31 and 41 of the respective series circuits are not overlapped with each other. Thus, even if the first switching circuit 20 includes multiple series circuits connected in parallel, both of the FETs 31 and 32 or both of the FETs 41 and 42 are not simultaneously turned on, which prevents overcurrent from occurring.

According to each of the embodiments described above, a metal oxide semiconductor field effect transistor (MOSFET) may be employed for the EFT, though not limited thereto, and an insulated gate bipolar transistor (IGBT), for example, may be employed.

It is to be understood that the embodiments herein disclosed are illustrative in all respects and not restrictive. The scope of the present invention is defined by the appended claims rather than by the above-described embodiment and examples preceding them, and all changes that fall within the meanings and the bounds of the claims, or equivalence of such meanings and bounds are intended to be embraced by the claims.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A power supply device, comprising:
   a first switching circuit that includes:
      a first series circuit having a high side switching element and a low side switching element connected in series that are alternately turned on and off at a predetermined frequency,
      a second series circuit having a high side switching element and a low side switching element connected in series that are alternately turned on and off at a predetermined frequency, and both the first series circuit and the second series circuit are connected between a predetermined voltage level and a ground level;
   a second switching circuit that constitutes a power factor control circuit, the second switching circuit including a first switching element and a second switching element each having one end connected to the ground level; and
   a control unit that performs control such that ON time points of the first switching element, the second switching element and the high side switching element of both the first series circuit and the second series circuit are not overlapped with each other;
   a rectifier circuit connected to the first switching circuit via a transformer; and
   an inductor connected to the output side of the rectifier circuit, wherein
   during the positive half-cycle of AC voltage applied to the second switching circuit, the control unit repeatedly turns on and off the first switching element and performs control such that the first switching element turns on with a time lag from an instance when the low side switching element of the first or second series circuit turns off and the corresponding high side switching element turns on, and
   during the negative half-cycle of AC voltage applied to the second switching circuit, the control unit repeatedly turns on and off the second switching element and performs control such that the second switching element turns on with a time lag from an instance when the low side switching element of the first or second series circuit turns off and the corresponding high side switching element turns on.

2. The power supply device according to claim 1, wherein the first switching circuit includes the first series circuit and the second series circuit connected in parallel, and the control unit performs control such that ON time points of the first and the second switching elements and the high side switching elements of respective ones of the series circuits are not overlapped with each other.

3. The power supply device according to claim 2, wherein the first switching circuit has one winding of the transformer connected at connection points of high side switching elements and low side switching elements of the respective ones of the series circuits, and has the rectifier circuit connected to another winding of the transformer.

4. The power supply device according to claim 1, wherein the second switching circuit comprises:
an inductor; and
a diode having an anode connected to one end of the inductor,
a cathode of the diode is connected to one end of the high side switching element of both the first series circuit and the second series circuit, and
another end of the first and the second switching elements are connected to a connection point of the inductor and the diode.

5. The power supply device according to claim 2, wherein the second switching circuit comprises:
an inductor; and
a diode having an anode connected to one end of the inductor,
a cathode of the diode is connected to one end of the high side switching element of both the first series circuit and the second series circuit, and
another end of the first and the second switching elements are connected to a connection point of the inductor and the diode.

6. The power supply device according to claim 3, wherein the second switching circuit comprises:
an inductor; and
a diode having an anode connected to one end of the inductor,
a cathode of the diode is connected to one end of the high side switching element of both the first series circuit and the second series circuit, and
another end of the first and the second switching elements are connected to a connection point of the inductor and the diode.

* * * * *